United States Patent [19]

Kyriakis

[11] Patent Number: 4,592,881
[45] Date of Patent: Jun. 3, 1986

[54] METHOD FOR CONTROLLING A FOAM RESIN CABLE COATING EXTRUSION PROCESS

[75] Inventor: John Kyriakis, Harrow, England

[73] Assignee: Beta Instrument Company Limited, Buckinghamshire, England

[21] Appl. No.: 551,900

[22] Filed: Nov. 15, 1983

[30] Foreign Application Priority Data

Nov. 15, 1982 [GB] United Kingdom ............... 8232556

[51] Int. Cl.⁴ ............... B29C 47/92; B29C 47/02; B29C 67/22
[52] U.S. Cl. ............... 264/40.1; 264/40.7; 264/45.9; 264/174; 425/113; 425/140; 425/145; 425/817 C
[58] Field of Search ............... 264/40.1, 40.4, 40.7, 264/45.9, 46.1, 174; 425/140, 145, 113, 817 C

[56] References Cited

U.S. PATENT DOCUMENTS

| | | | |
|---|---|---|---|
| 3,799,719 | 3/1974 | Bonikowski et al. | 264/40.7 X |
| 3,896,198 | 7/1975 | Utumi et al. | 264/40.1 X |
| 3,914,357 | 10/1975 | Cereijo et al. | 264/40.4 X |
| 4,229,392 | 10/1980 | Shimano et al. | 264/40.1 |

FOREIGN PATENT DOCUMENTS

| | | |
|---|---|---|
| 0000954 | 3/1979 | European Pat. Off. . |
| 1041732 | 9/1966 | United Kingdom . |
| 1442031 | 7/1976 | United Kingdom . |
| 1591534 | 1/1981 | United Kingdom . |

*Primary Examiner*—Philip Anderson
*Attorney, Agent, or Firm*—Fleit, Jacobson, Cohn & Price

[57] ABSTRACT

A method for controlling a cellular foam cable coating extrusion process wherein the quench point or temperature of the foamed coating being extruded onto the core material, and the ratio of speed of extrusion to line speed of the extrusion process are simultaneously adjusted respectively in response to two error signals indicative of a variation in relative permittivity and annular area of extruded coating from required specified values. The method results in a faster process than possible heretofore while at the same time a tighter tolerance on deviation from required parameters is possible.

4 Claims, 4 Drawing Figures

METHOD FOR CONTROLLING A FOAM RESIN CABLE COATING EXTRUSION PROCESS

FIELD OF THE INVENTION

The present invention relates to a method and apparatus for the control of cellular plastics coating during the manufacture of a cellular coated cable, otherwise known as an extrusion process.

BACKGROUND ART

It is generally known that, in order to manufacture an electrical cable, a process known as extrusion is used in which the electrical conductor is fed into a machine called the extruder which extrudes a plastics material on the conductor thereby creating an electrically insulated cable which may be used in various applications including the transmission of electrical energy and the transmission of signals, etc.

This process has advanced through the years, and electrical cables have been used in telecommunication applications in which many hundreds of cables are bunched together to form a trunk cable which is then installed between telephone contres, to form part of a telephone link network.

In order that the cable may be economically manufactured, various methods have been employed to reduce material costs which involve controlling the plastics coating of the cable to a minimum thickness. In order further to reduce material costs, a method has been introduced whereby the plastics coating of the cable is chemically "blown" or "foamed" producing a cellular structure which maintains the same wall thickness of insulation but, in fact, uses less plastics material. This method has been found to be successful, and the cellular cable produced maintins all the electrical characteristics required by the specifications relating to the final application, as well as being considerably cost effective in manufacture.

To control the coating process, all systems available so far, monitor the capacitance and/or diameter of the extruded cable and make appropriate adjustments when the measured values differ from those required.

These prior methods do not allow for the fact that diameter and capacitance are two conflicting parameters in terms of process control, and that the correction of one can drive the other ut of tolerance. In most cases capacitance control is the dominant correcting factor which results in an extremely slow overall correction process.

SUMMARY OF THE INVENTION

It is an object of the invention to, amongst other things, improve control of the coating process, in particular the amount of material being using in coating the cable. This aim is achieved by controlling coating using two process variables which are interdependent but non-interacting, these variables being individually corrected in a simultaneous continuous action in order to nullify the error in the variables, thereby avoiding the zig-zag time-consuming correction course which has to be followed at the present time with known systems.

According to the invention there is provided a method of controlling a cellular foam cable extrusion process comprising measuring the error in relative permittivity of the extruded coating between the required permittivity of the coating and actual permittivity of the foamed coating to provide a first eeror signal indicative thereof, measuring the error in annular area of the extruded coating between the required annular area of extruded coating and actual annular area being extruded to provide a second error signal indicative thereof, said actual area being corrected for existing errors in required relative permittivity of the coating at the time of measurement, and simultaneously adjusting both the quench point or temperature of the foamed coating being extruded, and the ratio of speed of extrusion to line speed of the extrusion process respectively, whereby directly to nullify both said first and second error signals.

This method allows the cellular coating process to be controlled to a more precise and refined degree than heretofore possible. It permits very rapid control compared with previous methods, and maintains a tight tolerance on the required parameters of the finished product.

BRIEF DESCRIPTION OF THE INVENTION

Other features and advantages of the present invention will become apparent from the description that follows wherein a preferred embodiment is disclosed and explained with reference to the accompanying drawings wherein.

BEST MODES OF CARRYING OUT THE INVENTION

Figure 1:
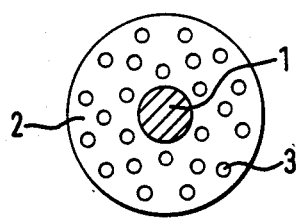
FIG. 1 is a cross-sectional view through a chemically-blown cellular cable.

The chemically-blown cellular cable shown in FIG. 1 comprises an electrical conductor 1 completely covered by a cellular insulating material 2,3. Such a finished cable can be produced using the extrusion line shown in FIG. 4, incorporating an extruder 4 shown in FIGS. 2 and 3.

Figure 2:
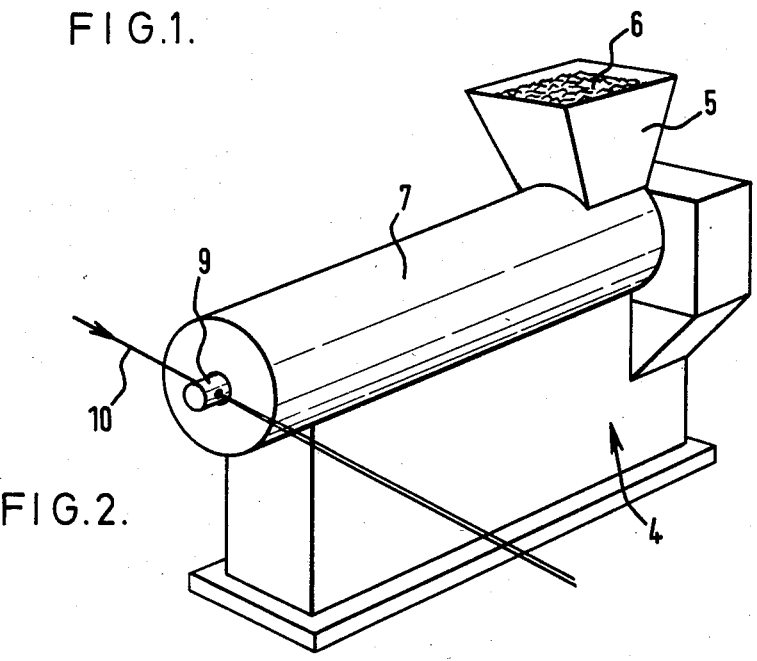
FIG. 2 is a perspective view of an extruder for extruding cellular plastics material.
Figure 3:
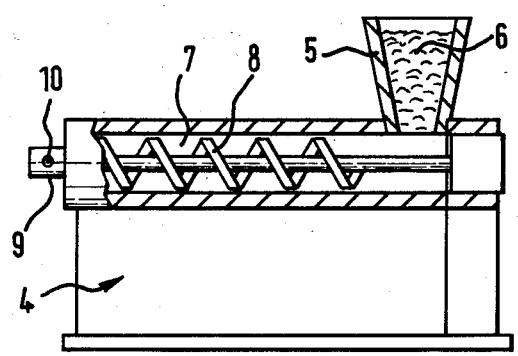
FIG. 3 is a cross-sectional view through the extruder of FIG. 2.

With reference first to FIGS. 2 and 3, the extruder 4 of the extrusion line, is provided with a hopper 5 containing solid plastics material 6, mixed with a chemical blowing agent, which is heated, at the start of an extrusion process, to a temperature of the order to 250° C.

The plastics in the molten state is then propagated along the barrel 7 of the extruder with the aid of a rotating screw 8, to a die tip 9 located at the end of the barrel 7.

The extruder screw 8, extrudes the molten material at the die 9 on a conductor 10, shown particularly in FIG. 2, which passes through the centre of the die 9.

Figure 4:
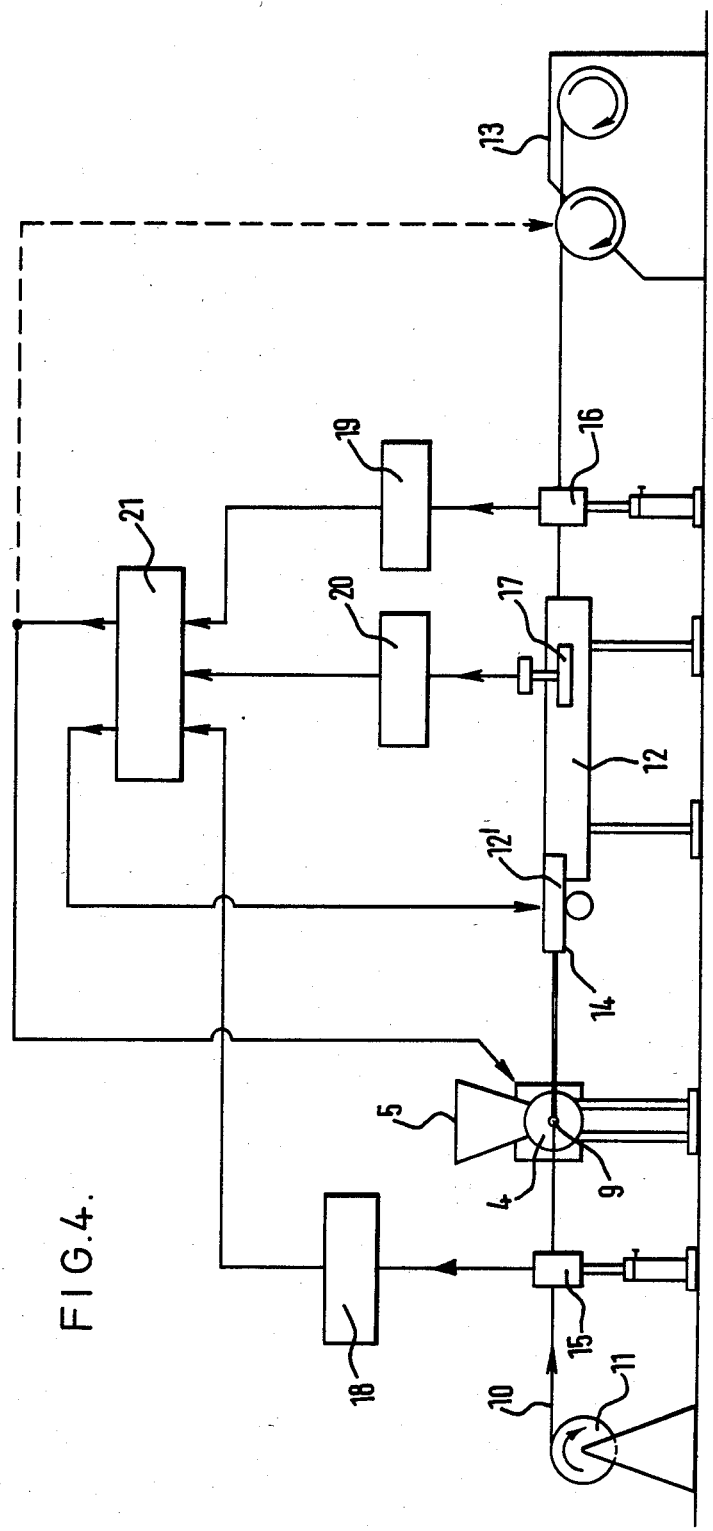
FIG. 4 is a schematic illustration of an extrusion line arranged and operable according to the present invention.

The extruder 4 is shown in FIG. 4 positioned in an extrusion line for completing the process of forming and taking up the finished foam insulated cable.

The extrusion line incorporates, upstream of the extruder 4, a pay-off unit 11 for the conductor wire 10 leading to the die 9, and downstream of the extruder 4, a water cooling trough 12 and finally a wire take-up unit 13 for the finished product.

In practice the molten plastics leaving the die 9 and extruding onto the conductor 10 foams or expands due to the presence of the special blowing agent and this expansion is checked at a quench point 14 which is defined by the entry to the adjustable front end 12' of the cooling trough 12.

The distance between the entry to the cooling trough 12 and the die 9 determines, to a certain extent, the amount of cellular expansion of the plastics.

The extrusion line has further equipment on which it enables certain monitoring to be performed in order that the final product is consistent with the specified requirements of the application.

A diameter gauge, preferably a non-contact device 15, is installed upstream of the extruder 4, between the pay-off unit 11 and the extruder 4, and measures the diameter of the incoming conductor 10. A second diameter gauge 16 is installed between the take-up unit 13 and trough 12 and this measures the overall diameter of the finished cable. A capacitance monitor 17 is installed in the cooling trough 12 and measures the electrical capacitance of the cable directly in picofarads per unit length.

The above monitors have the capability of displaying their respective readings on electronic indicators 18, 19 and 20, and a complete check on the production can be maintained at all times. In addition, the monitors output deviation signals, between the actual and the preset values of the required parameters.

This arrangement may be regarded as an instrumented line in an open loop configuration in which the variable parameters are monitored but not automatically controlled save by the intervention of an operator who can make adjustments to the line speed by adjusting the motor (not shown) coupled to the wire take-up unit 13 at the end of the production line.

Further manual adjustments can be made to the from end 12' of the cooling trough 12 thereby altering the distance between the quenching point 14 and the die head 9 in order to control the rate of cellular expansion of the cable insulation. Further adjustments can be made to the extruder screw revolutions 8 which would vary the amount of plastic being extruded on to the conductor 10. Additional adjustments could include the temperature of the barrel of the extruder which would influence the degree of chemical expansion of the cellular plastic issuing from the die head 9.

The present invention has the capability of calculating data from the extrusion line, utilising the diameter and the capacitance of the cable, computing it and providing an effective closed loop control which maintains a preselected condition of the parameters of the required cable. This is achieved in an electronically operated computer unit 21 which receives signals from the diameter gauge 16, measuring the overall diameter of the cable, as well as the capacitance monitor 17 and diameter gauge 15. It is also possible to substitute a preselected diameter signal for the signal from diameter gauge 15, corresponding to the core diameter.

The computer unit 21 examines these signals, and produces two outputs which are used to control the quench point 14 of the cooling trough 12 as well as the ratio of extruder screw revolutions and line speed.

In order to explain fully how this operates, reference may be had to the following calculations:

The capacitance of a cylindrical cable per unit length is determined from the formula:

$C = Er \times k / \log_e OD/DC$ $C$ = Capacitance per unit length $Er$ = Relative permittivity of the insulation $K$ = Constant $OD$ = Overall Diameter of extruded Cable $DC$ = Diameter of Conductor The computer unit 21 calculates two variables. The first is the relative permittivity (Er) of the cellular material and secondly the annular area of the cellular plastic of the cable or the volume per unit length of the cable.

The relative permittivity (Er) of the plastics is calculated by the computer 21 operating on the above equation and measuring the capacitance, the overall diameter (OD) and the Dc (Core diameter) of the cable. This, of course, depends on the amount by which the plastics is allowed to expand before it is quenched. The overall diameter (OD) is dependent on the volume of plastics applied per meter of wire and also on the amount by which the plastics is allowed to expand before it is quenched. Therefore, the capacitance and the diameter are both affected by the quench point 14, i.e. water trough position and the volume of plastics applied per unit length.

In the past, the characteristics of cable using cellular plastic insulation were determined by using the diameter error to control the volume of material applied via the extruder and the capacitance error to control the trough position. Such an arrangement results in severe interaction between the two control loops. The purpose of the computer unit 21 is greatly to reduce the interaction problem. It does this by making the following assumptions:

The purpose of the cooling trough 12 is to control the dielectric constant (Er) of the plastic. This is not the same as the capacitance since this is only correct when both the overall diameter (OD) and Er are correct.

For the second variable that the computer calculates, the annular area or volume per unit length of the plastic being deposited on the cable, the diameter gauges 15, 16 are used, or possibly diameter gauge 16, together with a preset signal substituted for diameter gauge 15.

The purpose of the extruder 4 is to control the volume of plastics per unit length. This is not the same as the diameter (OD) since this is only correct when both the volume output and the value of Er are correct.

The computer unit 21 requires that the core diameter (Dc), the required overall diameter (OD) and the required capacitance (C) can be set. For the purpose of future calculations, the various quantities involved will be given the following symbols:

Dc = Core Diameter set on computer
DS = Required overall diameter set on the computer
DA = Actual overall diameter measured by the diameter gauge
CS = Required capacitance set on computer
CA = Actual capacitance of cable measured by capacitance monitor
Z = Required relative permittivity (Er)
Y = Actual value of relative permittivity (Er)

The computer calculates both the actual and the required value of Er as follows:

$$Z = \frac{Cs \cdot lg_e (DS/Dc)}{K}$$

$$Y = \frac{Ca \cdot lg_e (DA/Dc)}{K}$$

The error signal used to control the trough 12 is Y−Z, ie. the error in relative permittivity.

The computer 21 also calculates both the actual and required area of plastics surrounding the wire. The area is, of course, proportional to the volume per unit length of cable.

Required Annular area of plastic $=\pi/4$ $(DS^2-Dc^2)$
Actual annular area of plastic $=\pi/4$ $(DA^2-Dc^2)$ This area, however, is affected by an error in the relative permittivity (Er) and, therefore, this must be compensated for in the computer before the extruder error signal can be found. The plastic coating has its highest value of Er when in its solid state with no gas bubbles within it. As the plastic expands the relative permittivity becomes diluted by the gas bubbles. If the plastic was expanded by an infinitely large amount it would be almost entirely full of bubbles and the relative permittivity would fall close to a value of one, ie, the value of Er for free space. It should be noted that, although the bubble contains gas, the value of Er for most gases is very close to one, ie. less than 1.005.

As an example take a solid plastic which has a dielectric constant of perhaps 2. If this is formed with gas bubbles to double its volume then it would be composed half of gas with a value for Er of nearly one and a half of plastic for which Er=2. The resultant value of Er is then $(0.5\times2)+(0.5\times1)=1.5$. The volume of the plastic is therefore related to Er as follows:

$$VA = v \times \frac{(Erx-1)}{(Era-1)} \quad (5)$$

Where
VA=actual volume
V=solid volume
Era=actual Er
Erx=value for solid plastic

As was stated earlier the area is proportional to the volume per unit length.

$$Ax = A \times \frac{(Erx-1)}{(Era-1)} \quad (6)$$

The actual area Aa is known, and what the value of Era is which was given the symbol Y earlier in the description. What the value of Er should be is also known, and this has been designated by the symbol Z. From these can be determined what the area would be if the value for Er is correct even though A or Erx are not known. This is done as follows:

$$Aca = A \times \left(\frac{Erx-1}{Z-1}\right) \quad \text{FROM (6)}$$

$$Aa = A \times \left(\frac{Erx-1}{Y-1}\right) \quad \text{FROM (6)}$$

This simplifies to:

$$Aca = Y-1$$

$$Aa = Z-1 \quad (7)$$

The unknowns A and Erx cancel out.
Aca=the corrected area
Aa=actual area
Y=actual value of Er
Z=required value of Er Transposing (7)

$$Aca = (Y-1)/(Z-1) \quad (8)$$

The error signal for the extruder is the difference between the actual area after it has been corrected for any error in Er, and the required area. This error signal is calculated as follows:

$$\text{ERROR} = \frac{\pi}{4}\left[(DS^2-DC^2) - \left[(DA^2-DC^2)\frac{Y-1}{Z-1}\right]\right] \quad (9)$$

In practice the constant $\pi$ is dropped and the equation is divided by Dc to give a similar gain to the error control loop with different cable sizes.

The computer unit 21, having now calculated these two variables, can output a signal proportional to the relative permittivity deviation, that is to say the difference between the actual measured permittivity and the required permittivity, and a second signal proportional to the annular area deviation or volume per unit length deviation which is the actual volume per unit length or calculated annular area of the measured volume per unit length or measured area per unit length.

These two secondary signals are used to control the line. The first is used to make an adjustment to the difference between the quench point and the extruder tip and the second signal to adjust the ratio of screw revolutions and line speed, these adjustments being performed simultaneously.

An alternative form of control would be to use the relative permittivity error to control the temperature of the extruder barrel and further the electrical permittivity error could be used to control the above temperature of the barrel as well as the distance between the quench point and the trough and the extruder die.

I claim:

1. A method of controlling a cellular foam coating extrusion process comprising measuring the error in relative permittivity of an extruded foamed coating between a required permittivity of the coating and actual permittivity of the coating to provide a first error signal indicative thereof, measuring the error in the annular area of the extruded foamed coating between the required annular area of the coating and actual annular area of the coating to provide a second error signal indicative thereof, including correcting measured values of said actual annular area for any measured error in the required relative permittivity of the foamed coating at the time of measurement, and simultaneously adjusting, in response to the first and second error signals, respectively, a quench point or an extrusion temperature of the foamed coating being extruded, and the ratio of speed of extrusion to line speed of the extrusion process, so as to nullify both of said first and second error signals, respectively.

2. A method as claimed in claim 1 wherein the required capacitance of the coated cable, overall diameter, and core diameter are first stored, said required value of relative permittivity being calculated from these stored parameters, and the actual value of the relative permittivity being measured during extrusion is compared with said required value to provide said first error signal.

3. A method as claimed in claim 2 wherein the required annular area is calculated from said stored parameters and compared with the measured actual annular area during extrusion, to provide said second error signal.

4. A method as claimed in claim 2 wherein the capacitance of the extruded coated cable and overall diameter thereof, are measured during extrusion, and from which is calculated said actual relative permittivity and actual annular area of the extruded coating.

* * * * *